(12) United States Patent
DeGurski et al.

(10) Patent No.: US 8,050,007 B1
(45) Date of Patent: Nov. 1, 2011

(54) LIGHTNING DAMAGE ABATEMENT SYSTEM AND ATTACHMENT METHOD

(76) Inventors: Wayne P. DeGurski, Tampa, FL (US);
David R. Cordoves, Tampa, FL (US);
Rick A. Caruso, Odessa, FL (US)

(*) Notice: Subject to any disclaimer, the term of this patent is extended or adjusted under 35 U.S.C. 154(b) by 313 days.

(21) Appl. No.: 12/315,052

(22) Filed: Nov. 26, 2008

(51) Int. Cl.
*H02H 1/00* (2006.01)
*H02H 3/00* (2006.01)
(52) U.S. Cl. ......... 361/117; 361/216; 361/132; 361/222
(58) Field of Classification Search .................. 361/117, 361/132, 216, 222; 174/2, 3, 51, 78, 5 SG; 428/200, 346
See application file for complete search history.

(56) References Cited

U.S. PATENT DOCUMENTS

| | | | | |
|---|---|---|---|---|
| 1,818,494 | A * | 8/1931 | Mershimer | 174/4 R |
| 2002/0157842 | A1* | 10/2002 | Rapp | 174/2 |
| 2003/0219568 | A1* | 11/2003 | Nee | 428/138 |
| 2009/0308630 | A1* | 12/2009 | Chung | 174/3 |

* cited by examiner

*Primary Examiner* — Patrick Salce

(57) ABSTRACT

An air terminal/point base has an air terminal/point plate with upper and lower surfaces and apertures. The upper surface has an upstanding cylinder with a threaded aperture. An air terminal/point has a threaded base coupled to the threaded aperture. A conductive cable couples the air terminal/point to a ground. A patch of roofing material having upper and lower surfaces is in a configuration corresponding to the air terminal/point plate. The patch has a plurality of apertures in axial alignment with the apertures of the air terminal/point plate. A rivet extends through the apertures of the air terminal/point plate and each patch coupling the lower surface of the air terminal/point plate to the upper surface of an associated patch. The method includes the step of cohering the patch to the material through the application of pressure applied for 3 to 5 seconds and heat at a temperature of 122 degrees Fahrenheit.

3 Claims, 6 Drawing Sheets

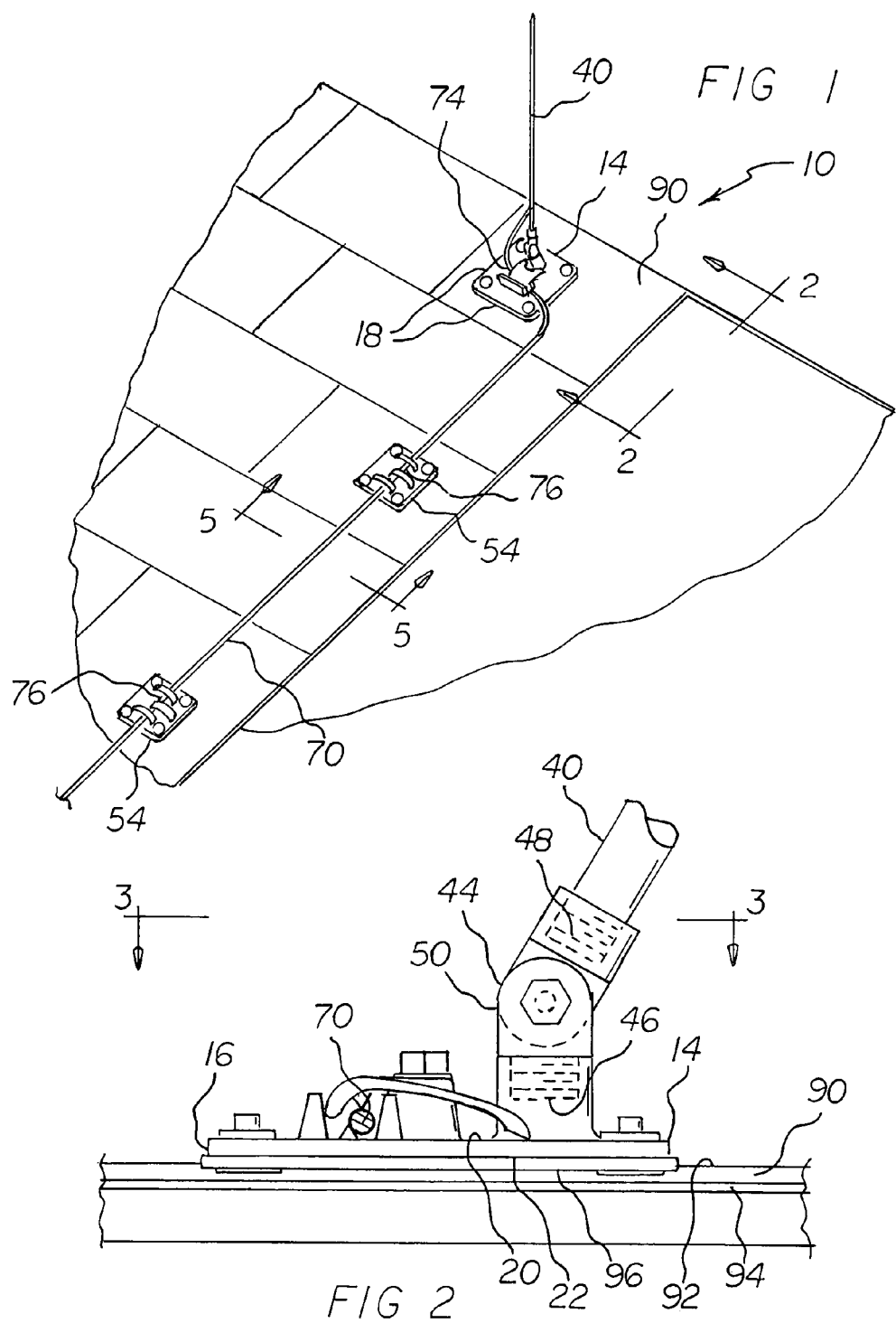

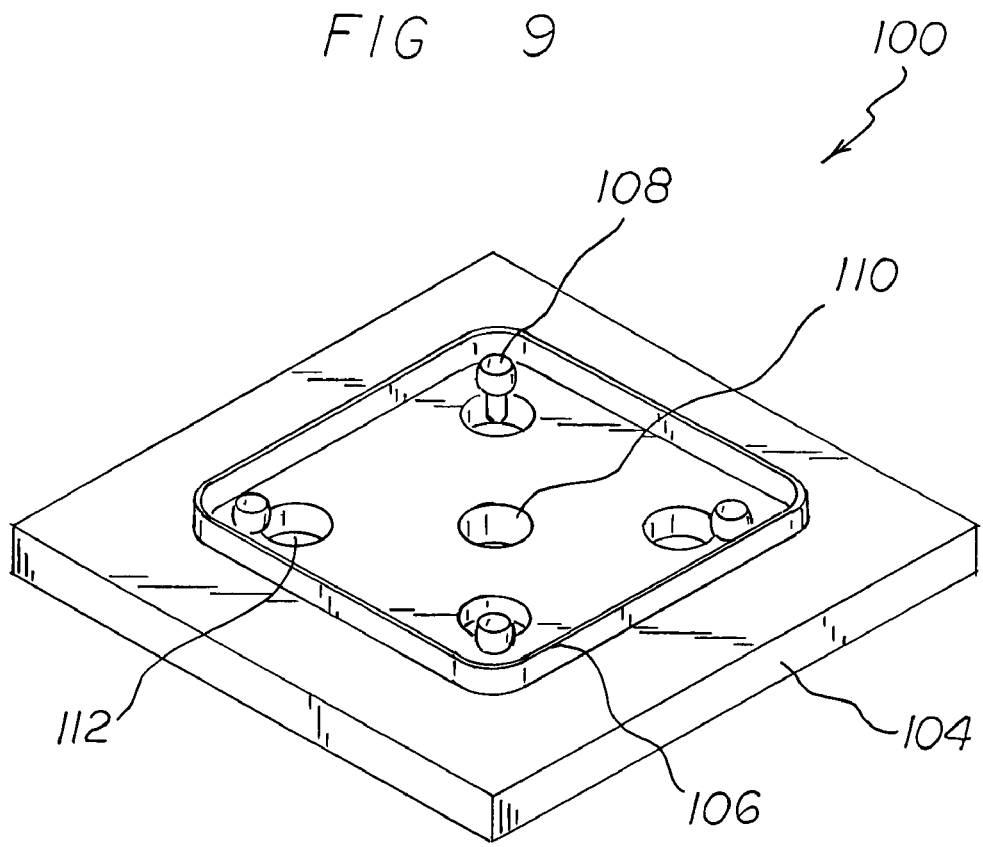

LIGHTNING DAMAGE ABATEMENT SYSTEM AND ATTACHMENT METHOD

BACKGROUND OF THE INVENTION

Field of the Invention

The present invention relates to a lightning damage abatement system and attachment method and more particularly pertains to attaching lightning damage abatement components to any and all roofing systems in a safe, secure, convenient and economical manner.

SUMMARY OF THE INVENTION

In view of the foregoing disadvantages inherent in the known types of lightning damage abatement systems of known designs and configurations now present in the prior art, the present invention provides an improved lightning damage abatement system and attachment method. As such, the general purpose of the present invention, which will be described subsequently in greater detail, is to provide a new and improved lightning damage abatement system and attachment method which has all the advantages of the prior art and none of the disadvantages.

To attain this, the present invention essentially comprises a lightning damage abatement system and attachment method. First provided is an air terminal/point base. The air terminal/point base has an electrically conductive metallic air terminal/point plate. The air terminal/point plate is of a rectangular, round, oval or square configuration. The air terminal/point plate has a thickness of between 0.06 inches and 0.25 inches. The air terminal/point plate has an upper surface. The air terminal/point plate has a lower surface. The air terminal/point plate has an aperture. The aperture is provided adjacent to each edge. The air terminal/point plate has supplemental weight reducing apertures. The upper surface has upstanding spaced shoulders. In this manner a cable passageway is formed. The upper surface has a threaded bore. The upper surface has a cover. The cover is positioned over the passageway. The upper surface has a bolt. The bolt removably couples the cover with respect to the threaded bore and the passageway. The upper surface also has an upstanding cylinder. The upstanding cylinder has a threaded aperture.

An air terminal/point is provided. The air terminal/point has a threaded base. The air terminal/point has a coupling member. The coupling member has a threaded lower portion. The lower portion is removably received in the threaded aperture of the upstanding cylinder. The coupling member has an upper end. The upper end has a threaded hole. The threaded hole removably receives the lower end of the air terminal/point. The upper end has a clevis. The clevis pivotally couples the air terminal/point and the air terminal/point base.

Provided next is a plurality of cable clips. Each cable clip has an electrically conductive metallic clip plate. The clip plate is in a rectangular, round, oval or square configuration. Each cable plate has sides. Each cable plate has a thickness of between 0.06 inches and 0.25 inches. Each cable clip has an upper surface. Each cable clip has a lower surface. Each cable plate has a plurality of apertures. The upper surfaces each have bendable fingers or inserts.

A conductive cable is provided. The cable is adapted to couple the air terminal/point to a ground. The cable has central sections. The central sections are coupled to the air terminal/point base and cable clips.

A patch of roofing material is provided next. The patch is in a configuration corresponding to each base. Each patch has an upper surface. Each patch has a lower surface. The sides are of equal length between 25 and 80 percent greater than each side of a base clip. Each patch has a thickness of between 3 mils and 4 mils. Each patch has a plurality of apertures. The apertures of each patch are in axial alignment with the apertures of the air terminal/point plate and cable clips.

Further provided is a rivet. The rivet extends through the apertures of each air terminal/point plate and cable clip and through each patch. The rivet couples the lower surface of each air terminal/point plate and cable clip to the upper surface of an associated patch.

Provided last is a roof material. The roof has an upper surface. The roof material has a lower surface. The lower surface of the material is positionable upon an upper surface of a roof of a building. The upper surface of the roof material and the lower surfaces of the patches are in contact. An area of cohesion is provided. The area of cohesion attaches the patches to the roofing material. The roofing material and each of the patches are fabricated of the same material. The method further includes the step of cohering the patches to the roofing system through the application of pressure and heat, the pressure being applied for 3 to 5 seconds at a temperature of 122 degrees Fahrenheit.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lightning damage abatement system and attachment method which has all of the advantages of the prior art weather damage abatement systems of known designs and configurations and none of the disadvantages.

It is another object of the present invention to provide a new and improved lightning damage abatement system and attachment method which may be easily and efficiently manufactured and marketed.

It is further object of the present invention to provide a new and improved lightning damage abatement system and attachment method which is of durable and reliable constructions.

An even further object of the present invention is to provide a new and improved lightning damage abatement system and attachment method which is susceptible of a low cost of manufacture with regard to both materials and labor, and which accordingly is then susceptible of low prices of sale to the consuming public, thereby making such lightning damage abatement system and attachment method economically available to the buying public.

Even still another object of the present invention is to provide a lightning damage abatement system and attachment method for attaching lightning damage abatement components to any and all roof systems material commonly known as built up, modified, shingle, TPO, single ply, being an asphalt, rubber, plastic or metal, all in a safe, secure, convenient and economical manner.

Lastly, it is an object of the present invention to provide a new and improved lightning damage abatement system and attachment method. An air terminal/point base has an air terminal/point plate with upper and lower surfaces and apertures. The upper surface has an upstanding cylinder with a threaded aperture. An air terminal/point has a threaded base coupled to the threaded aperture. A conductive cable couples the air terminal/point to a ground. A patch of roofing material having upper and lower surfaces is in a configuration corresponding to the air terminal/point plate. The patch has a plurality of apertures in axial alignment with the apertures of the air terminal/point plate. A rivet extends through the apertures of the air terminal/point plate and each patch coupling the lower surface of the air terminal/point plate to the upper surface of an associated patch. The method includes the step of cohering the patch to the material through the application of pressure applied for 3 to 5 second and heat at a temperature of 122 degrees Fahrenheit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a lightning damage abatement system constructed in accordance with the principles of the present invention.

FIG. 2 is a side elevational view of the air terminal/point base taken along line 2-2 of FIG. 1.

FIG. 9 is a perspective illustration of a device for forming the patches.

The same reference numerals refer to the same parts throughout the various Figures.

DESCRIPTION OF THE PREFERRED EMBODIMENT

Figure 3:
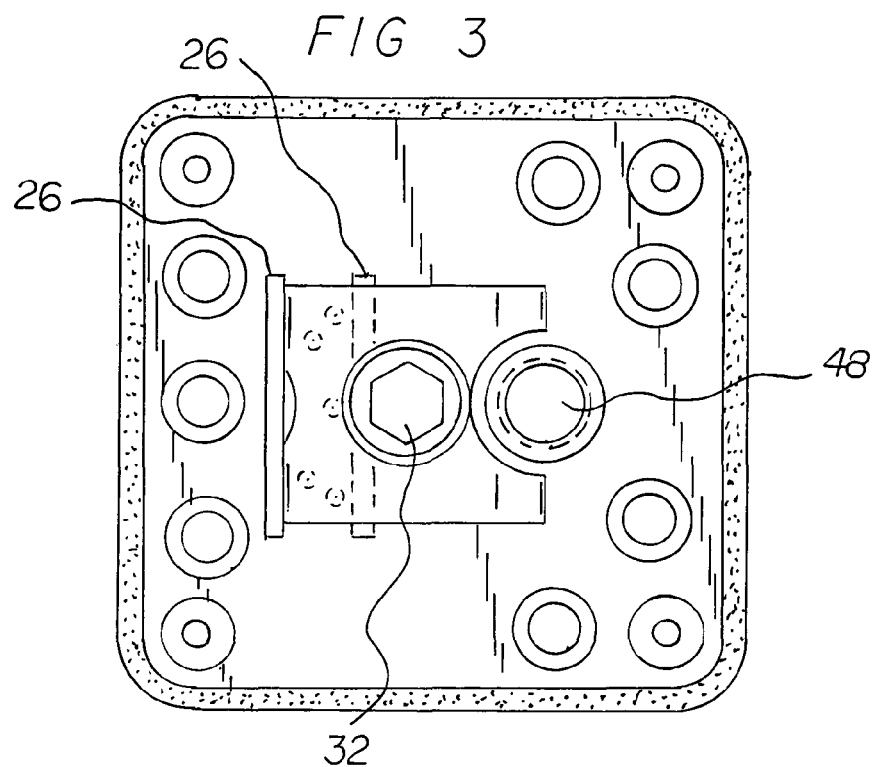
FIG. 3 is a cross sectional view of the air terminal/point base taken along line 3-3 of FIG. 2.
Figure 4:
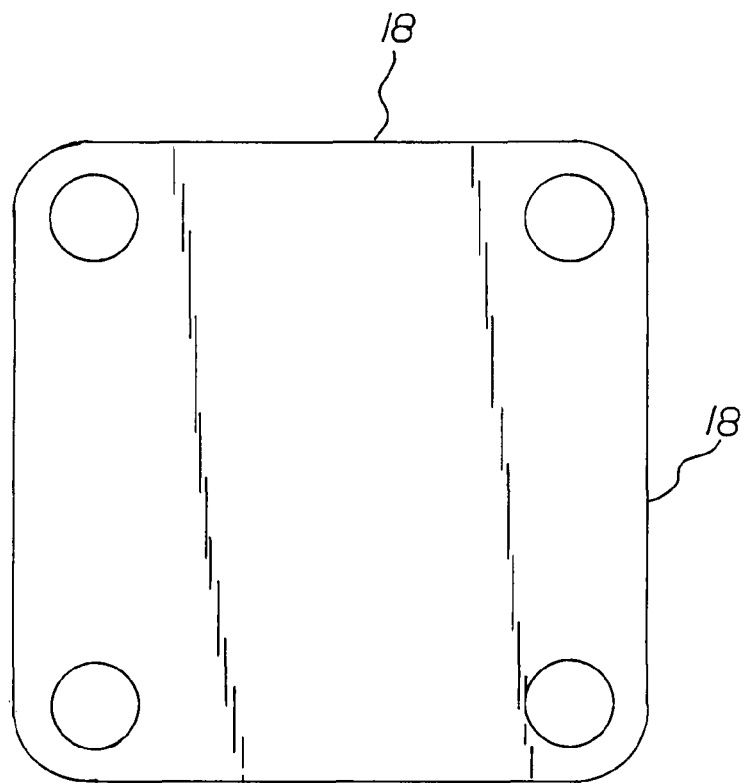
FIG. 4 is a bottom view of the air terminal/point plate taken along line 4-4 of FIG. 2.
Figure 5:
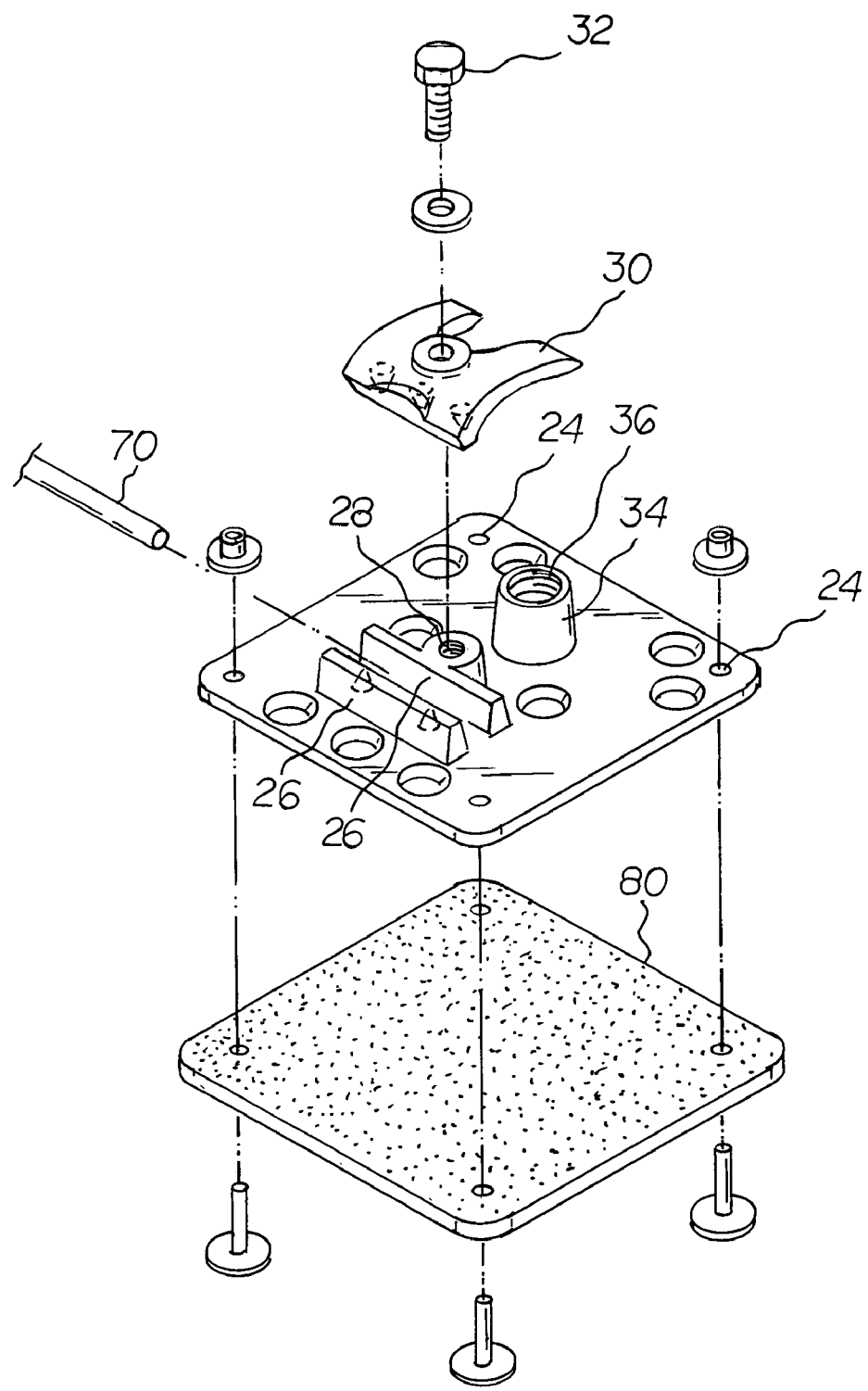
FIG. 5 is an enlarged exploded perspective view of an air terminal/point base.
Figure 6:
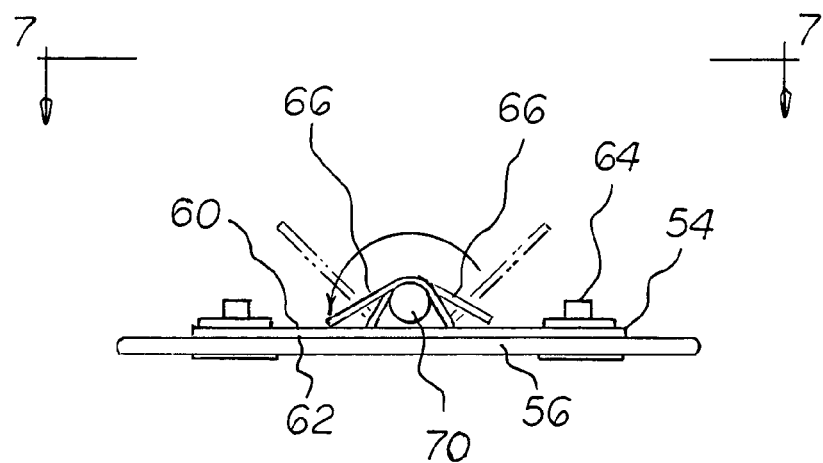
FIG. 6 is a side elevational view of a cable base taken along line 6-6 of FIG. 1.
Figure 7:
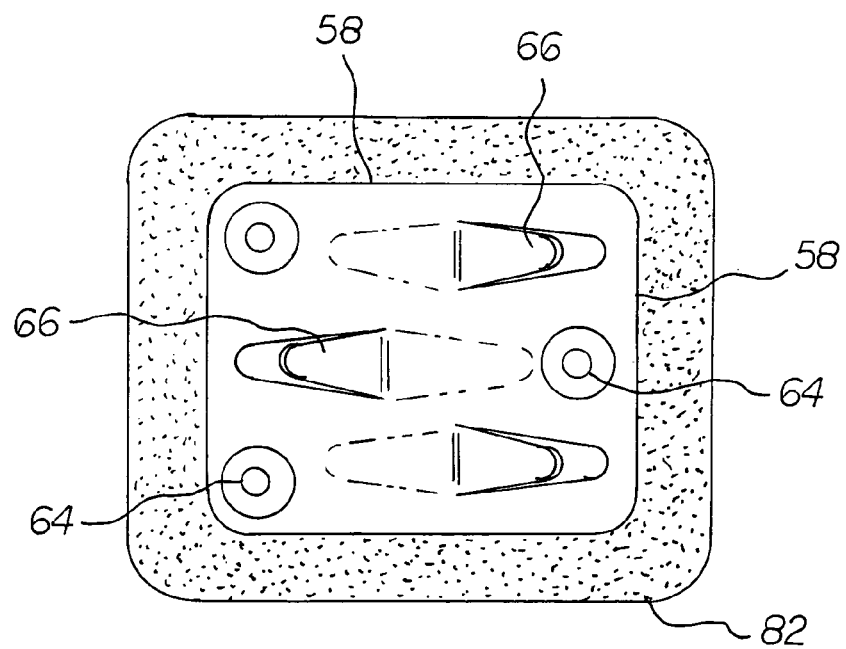
FIG. 7 is a plan view of the cable base taken along line 7-7 of FIG. 6.
Figure 8:
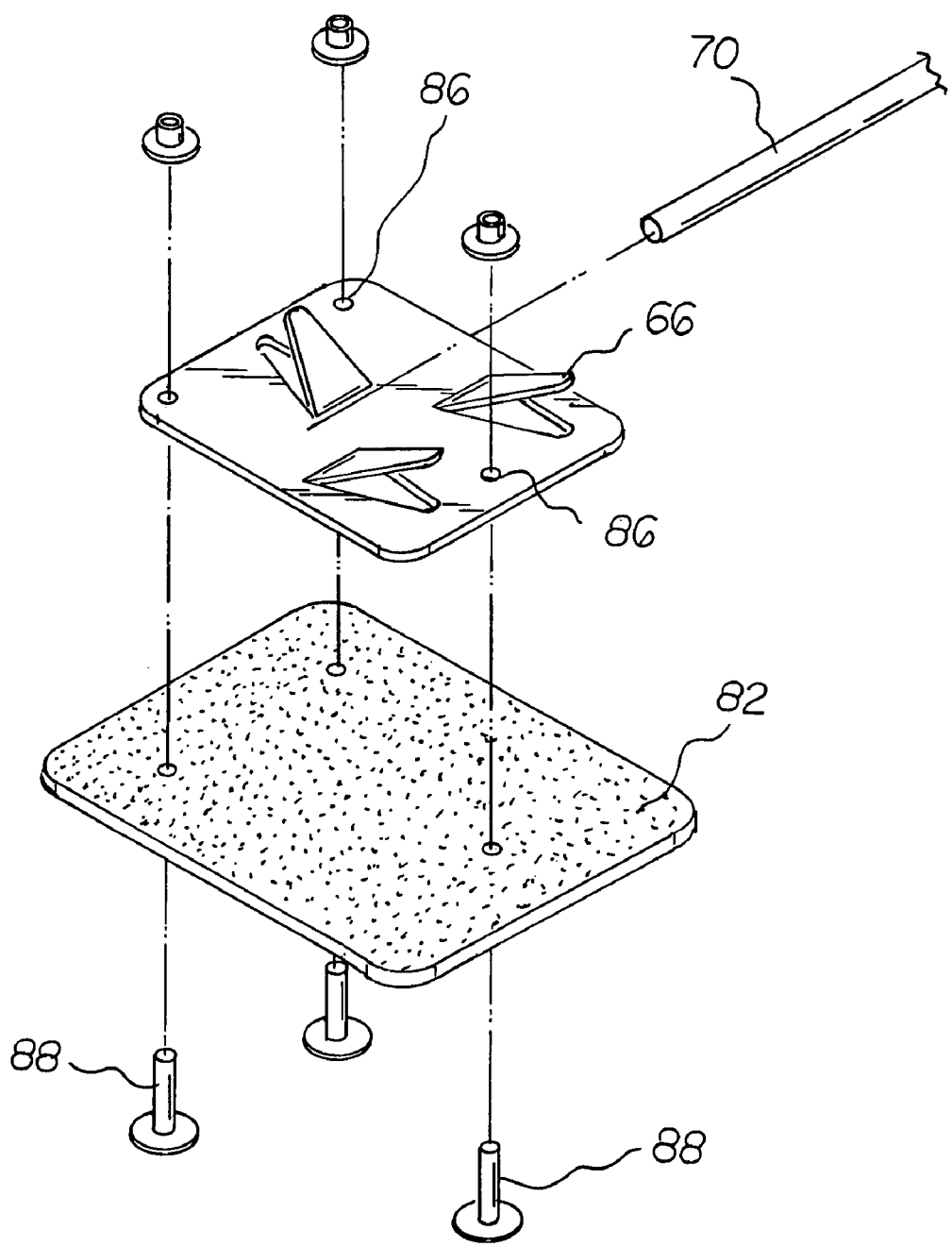
FIG. 8 is an enlarged exploded perspective view of an air terminal/point base.

With reference now to the drawings, and in particular to FIG. 1 thereof, the preferred embodiment of the new and improved lightning damage abatement system and attachment method embodying the principles and concepts of the present invention and generally designated by the reference numeral 10 will be described.

The present invention, the lightning damage abatement system 10 is comprised of a plurality of components. Such components in their broadest context include an air terminal/point base, an air terminal/point, a conductive cable, a patch of roofing material and a rivet. Such components are individually configured and correlated with respect to each other so as to attain the desired objective.

First provided is an air terminal/point base 14. The air terminal/point base has an electrically conductive metallic air terminal/point plate 16. The air terminal/point plate is in a rectangular configuration. The air terminal/point base has sides 18. The sides are of an equal length, 4 inches plus or minus 10 percent. The air terminal/point plate has a thickness of 0.25 inches plus or minus 10 percent. The air terminal/point plate has an upper surface 20. The air terminal/point plate has a lower surface 22. The air terminal/point plate has an aperture 24. The aperture is provided adjacent to each corner. The air terminal/point plate has supplemental weight reducing apertures. The upper surface has upstanding spaced shoulders 26. In this manner a cable passageway is formed. The upper surface has a threaded bore 28. The upper surface has a cover 30. The cover is positioned over the passageway. The upper surface has a bolt 32. The bolt removably couples the cover with respect to the threaded bore and the passageway. The upper surface also has an upstanding cylinder 34. The upstanding cylinder has a threaded aperture 36.

An air terminal/point 40 is provided. The air terminal/point has a threaded base 42. The air terminal/point has a coupling member 44. The coupling member has a threaded lower portion 46. The lower portion is removably received in the threaded aperture of the upstanding cylinder. The coupling member has an upper end. The upper end has a threaded hole 48. The threaded hole removably receives the lower end of the air terminal/point. The upper end has a clevis 50. The clevis pivotally couples the air terminal/point and the air terminal/point base.

Provided next is a plurality of cable bases 54. Each cable base has an electrically conductive metallic cable plate 56. The cable plate is in a rectangular configuration. The cable plate has four corners. Each cable plate has sides 58. The sides are of unequal length, 3 inches by 2.5 inches plus or minus 10 percent. Each cable plate has a thickness of 0.25 inches plus or minus 10 percent. Each cable plate has an upper surface 60. Each cable plate has a lower surface 62. Each cable plate has a plurality of apertures 64. The upper surfaces each have bendable fingers 66.

A conductive cable 70 is provided. The cable is adapted to couple the air terminal/point to a ground. The cable has central sections 74, 76. The central sections are coupled to the air terminal/point base and cable bases.

A patch 80, 82 of roofing material is provided next. The patch is in a configuration corresponding to each base. Each patch has an upper surface. Each patch has a lower surface. Each patch has four sides. The sides are of equal length between 25 and 80 percent greater than each side of a base. Each patch has a thickness of between 3 mils and 4 mils. Each patch has a plurality of apertures 86. The apertures of each patch are in axial alignment with the apertures of the air terminal/point plate and cable plates.

Further provided is a rivet 88. The rivet extends through the apertures of each air terminal/point plate and cable plate and through each patch. The rivet couples the lower surface of each air terminal/point plate and cable plate to the upper surface of an associated patch.

Provided last is a roof material 90. The roof material has an upper surface 92. The roof material has a lower surface 94. The lower surface of the material is positionable upon an upper surface of a building. The upper surface of the material and the lower surfaces of the patches are in contact. An area of cohesion 96 is provided. The area of cohesion attaches the patches to the material. The material and each of the patches are fabricated of the same material.

The system further includes a device 100 for forming the patches. The device includes a planar base 104 with an upstanding rectangular cutter 106 to cut out the periphery of the patch. The device also includes four small tubular cutters 108 to cut out small holes in the patch near its corners. A central hole 110 through the base is formed for handling purposes. Lastly, a recess 112 is in the base adjacent to each tubular cutter for receiving the material of the patches cut out by the tubular cutters.

In addition, the foregoing present invention may also be considered as a method for attaching lightning damage abatement components to a shingle roof in a safe, secure, convenient and economical manner.

The first step is providing an air terminal/point base 14. The air terminal/point base has an electrically conductive metallic air terminal/point plate 16. The air terminal/point plate is in a rectangular configuration. The air terminal/point plate has four corners. The air terminal/point base has four sides 18. The sides are of an equal length, 4 inches plus or minus 10 percent. The air terminal/point plate has a thickness of 0.25 inches plus or minus 10 percent. The air terminal/point plate has an upper surface 20. The air terminal/point plate has a lower surface 22. The air terminal/point plate has an aperture 24. The apertures is provided adjacent to each corner. The air terminal/point plate has supplemental weight reducing apertures. The upper surface has upstanding spaced shoulders 26. In this manner a cable passageway is formed. The upper surface has a threaded bore 28. The upper surface has a cover 30. The cover is positioned over the passageway. The upper surface has a bolt 32. The bolt removably couples the cover with respect to the threaded bore and the passageway. The upper surface also has an upstanding cylinder 34. The upstanding cylinder has a threaded aperture 36.

The second step is providing an air terminal/point 40. The air terminal/point has a threaded base 42. The air terminal/point has a coupling member 44. The coupling member has a threaded lower portion 46. The lower portion is removably received in the threaded aperture of the upstanding cylinder. The coupling member has an upper end. The upper end has a threaded hole 48. The threaded hold removably receives the lower end of the air terminal/point. The upper end has a clevis 50. The clevis pivotally couples the air terminal/point and the air terminal/point base.

The third step is providing a plurality of cable bases 54. Each cable base has an electrically conductive metallic cable plate 56. The cable plate is in a rectangular configuration. The cable plate has four corners. Each cable plate has sides 58. The sides are of unequal length, 3 inches by 2.5 inches plus or minus 10 percent. Each cable plate has a thickness of 0.25 inches plus or minus 10 percent. Each cable plate has an upper surface 60. Each cable plate has a lower surface 62. Each cable plate has a plurality of apertures 64. The upper surfaces each have bendable fingers 66.

The fourth step is providing a conductive cable 70. The cable is adapted to couple the air terminal/point to a ground. The cable has central sections 74, 76. The central sections are coupled to the air terminal/point base and cable bases.

The fifth step is providing a patch 80, 82 of roofing material. The patch is in a configuration corresponding to each base. Each patch has an upper surface. Each patch has a lower surface. Each patch has four sides. The sides are of equal length between 25 and 80 percent greater than each side of a base. Each patch has a thickness of between 3 mils and 4 mils. Each patch has a plurality of apertures 86. The apertures are in axial alignment with the apertures of the air terminal/point plate and cable plates.

The sixth step is providing a rivet 88. The rivet extends through the apertures of each air terminal/point plate and cable plate and through each patch. The rivet couples the lower surface of each air terminal/point plate and cable plate to the upper surface of an associated patch.

The seventh step is providing roof material 90. The roof material has an upper surface 92. The roof material has a lower surface 94. The lower surface of the roof material is positionable upon an upper surface of a building. The upper surface of the material and the lower surfaces of the patches are in contact. The material and each of the patches are fabricated of the same material.

The final step is cohering the patches to the material through the application of pressure and heat. The pressure is applied for 3 to 5 seconds at a temperature of about 122 degrees Fahrenheit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lightning damage abatement method comprising:
    providing an air terminal/point base having an air terminal/point plate with an upper and lower surface, the air terminal/point plate having apertures, the upper surface having an upstanding cylinder with a threaded aperture;
    providing an air terminal/point with a threaded base coupled to the threaded aperture;
    providing a conductive cable adapted to couple the air terminal/point to a ground;
    providing a patch of roofing material in a configuration corresponding to the air terminal/point plate, the patch having an upper and lower surface, the patch having a plurality of apertures in axial alignment with the apertures of the air terminal/point plate;

providing a rivet extending through the apertures of the air terminal/point plate and each patch to couple the lower surface of the air terminal/point plate to the upper surface of an associated patch; and providing a roof and cohering the patch to the roof through the application of pressure and heat, the pressure being applied for 3 to 5 seconds at a temperature of about 122 degrees Fahrenheit.

2. A lightning damage abatement method for attaching lightning damage abatement components to a shingle roof in a safe, secure, convenient and economical manner, the system comprising, in combination:

providing an air terminal/point base having an electrically conductive metallic air terminal/point plate in a rectangular configuration with four corners, the air terminal/point base having four sides of equal length, 4 inches plus or minus 10 percent, the air terminal/point plate having a thickness of 0.25 inches plus or minus 10 percent, the air terminal/point plate having an upper surface and a lower surface, the air terminal/point plate having an aperture adjacent to each corner with supplemental weight reducing apertures, the upper surface having upstanding spaced shoulders forming a cable passageway and a threaded bore with a cover positioned aver the passageway and with a bolt removably coupling the cover with respect to the threaded bore and the passageway, the upper surface also having an upstanding cylinder with a threaded aperture;

providing an air terminal/point with a threaded base and a coupling member, the coupling member having a threaded lower portion removably received in the threaded aperture of the upstanding cylinder, the coupling member having an upper end with a threaded hole for removably receiving the lower end of the air terminal/point and with a clevis pivotally coupling the air terminal/point and the air terminal/point base;

providing a plurality of cable bases, each cable base having an electrically conductive metallic cable plate in a rectangular configuration with four corners, each cable plate having sides of unequal length, 3 inches by 2.5 inches plus or minus 10 percent, each cable plate having a thickness of 0.25 inches plus or minus 10 percent, each cable plate having an upper surface and a lower surface, each cable plate having a plurality of apertures, the upper surfaces each having bendable fingers;

providing a conductive cable adapted to couple the air terminal/point to a ground, the cable having central sections coupled to the air terminal/point base and cable bases;

providing a patch of roofing material in a configuration corresponding to each base, each patch having an upper surface and a lower surface with four sides of equal length between 25 and 80 percent greater than each side of a base, each patch having a thickness of between 3 mils and 4 mils, each patch having a plurality of apertures in axial alignment with the apertures of the air terminal/point plate and cable plates;

providing a rivet extending through the apertures of each air terminal/point plate and cable plate and through each patch to couple the lower surface of each air terminal/point plate and cable plate to the upper surface of an associated patch;

providing a roof having an upper surface and a lower surface positionable upon an upper surface of a building, the upper surface of the roof and the lower surfaces of the patches being in contact, the roof and each of the patches being fabricated of the same material; and cohering the patches to the roof through the application of pressure and heat, the pressure being applied for 3 to 5 seconds at a temperature of 122 degrees Fahrenheit.

3. A lightning damage abatement system comprising:

an air terminal/point base having an air terminal/point plate with an upper and lower surface, the air terminal/point plate having apertures, the upper surface having an upstanding cylinder with a threaded aperture;

an air terminal/point with a threaded base coupled to the threaded aperture;

a conductive cable adapted to couple the air terminal/point to a ground;

a patch of roofing material in a configuration corresponding to the air terminal/point plate, the patch having an upper and lower surface, the patch having a plurality of apertures in axial alignment with the apertures of the air terminal/point plate;

a rivet extending through the apertures of the air terminal/point plate and each patch to couple the lower surface of the air terminal/point plate to the upper surface of an associated patch; and a device for forming the patches, the device including a planar base with an upstanding rectangular cutter to cut out the periphery of a patch and four small tubular cutters to cut out small holes in the patch near its corners, a central hole through the base for handling purposes and a recess in the base adjacent to each tubular cutter for receiving the material of the patches cut out by the tubular cutter.

* * * * *